US012592032B2

(12) United States Patent
Benslimane et al.

(10) Patent No.: US 12,592,032 B2
(45) Date of Patent: Mar. 31, 2026

(54) UNLOCKING LIGHTWEIGHT FAST 3D VISUALIZATION WITH NEURAL RADIANCE REPRESENTATIONS

(71) Applicant: Schlumber Technology Corporation, Sugar Land, TX (US)

(72) Inventors: Salma Benslimane, Houston, TX (US); Prasham Sheth, Sunnyvale, CA (US); Kishore Mulchandani, Houston, TX (US); Vineet Kamboj, Houston, TX (US); Crispin Chatar, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 136 days.

(21) Appl. No.: 18/541,585

(22) Filed: Dec. 15, 2023

(65) Prior Publication Data

US 2024/0203050 A1    Jun. 20, 2024

Related U.S. Application Data

(60) Provisional application No. 63/433,009, filed on Dec. 15, 2022.

(51) Int. Cl.
*G06T 17/00* (2006.01)
*G06T 7/10* (2017.01)
*G06T 7/70* (2017.01)

(52) U.S. Cl.
CPC .............. *G06T 17/00* (2013.01); *G06T 7/10* (2017.01); *G06T 7/70* (2017.01)

(58) Field of Classification Search
CPC ... G06T 11/00; G06T 7/70; G06T 7/10; G06T 17/00; G06T 15/08; G01V 1/345

USPC .......................................................... 345/418
See application file for complete search history.

(56) References Cited

U.S. PATENT DOCUMENTS

| | | | |
|---|---|---|---|
| 12,333,756 B2 * | 6/2025 | Arksey | G08G 5/57 |
| 2012/0109591 A1 | 5/2012 | Thompson et al. | |
| 2016/0005211 A1 | 1/2016 | Sarkis et al. | |
| 2022/0397917 A1 * | 12/2022 | Arksey | H04B 17/27 |
| 2023/0137403 A1 * | 5/2023 | Gallo | G06V 40/20 |
| | | | 348/47 |
| 2023/0177771 A1 * | 6/2023 | Assarsson | G06T 15/06 |
| | | | 345/420 |

(Continued)

FOREIGN PATENT DOCUMENTS

| | | | |
|---|---|---|---|
| KR | 10-20200063367 A | 6/2020 | |
| KR | 20200063367 A * | 6/2020 | G06N 3/08 |
| WO | WO-2022182369 A1 * | 9/2022 | G06T 15/04 |

OTHER PUBLICATIONS

Persson, Filip, and Alfred Hazard. "Camera Pose Estimation and Multiview 2D to 3D Reconstruction." (2022).*

(Continued)

*Primary Examiner* — Phu K Nguyen
(74) *Attorney, Agent, or Firm* — Kyle R. Miiller

(57) ABSTRACT

The description is directed to a method of visualization, involving capturing a multitude of two-dimensional images, generating transforms for each of the multitude of two-dimensional images, generating a three-dimensional representation of an object or scene based on the transforms, where the three-dimensional representation is a novel view, and rendering the three-dimensional representation of the object or scene.

20 Claims, 6 Drawing Sheets

(56) References Cited

U.S. PATENT DOCUMENTS

| | | | |
|---|---|---|---|
| 2023/0283759 A1* | 9/2023 | Frayne | H04N 13/194 |
| | | | 348/48 |
| 2024/0289932 A1* | 8/2024 | Ye | G06T 17/00 |
| 2024/0370983 A1* | 11/2024 | Schwartz | G06T 7/0002 |
| 2025/0037244 A1* | 1/2025 | Mildenhall | G06T 5/60 |

OTHER PUBLICATIONS

Eisert P, Steinbach E, Girod B. Automatic reconstruction of stationary 3-D objects from multiple uncalibrated camera views. IEEE Transactions on Circuits and Systems for Video Technology. Aug. 6, 2002; 10(2):261-77.*

Eisert P, Steinbach E, Girod B. Multi-hypothesis, volumetric reconstruction of 3-D objects from multiple calibrated camera views. In1999 IEEE International Conference on Acoustics, Speech, and Signal Processing. Proceedings. ICASSP99 (Cat. No. 99CH36258) Mar. 15, 1999 (vol. 6, pp. 3509-3512). IEEE.*

Koch R. 3-D Scene Modeling from Stereoscopic Image Sequences. Image Processing for Broadcast and Video Production. Dec. 6, 2012:128-35.*

Mildenhall, Ben et al. "NeRF: Representing Scenes as Neural Radiance Fields for View Synthesis." European Conference on Computer Vision (2020).

Müller, Thomas et al. "Instant neural graphics primitives with a multiresolution hash encoding." ACM Transactions on Graphics (TOG) 41 (2022): 1-15.

Alex Yu et al., "pixeINeRF: Neural Radiance Fields from One or Few Images", m-Xiv:2012.02190vl; pp. 1-20, Dec. 3, 2020 [retrieved on: Aug. 6, 2024], Retrieved from: <https://arxiv.org/.

Search Report and Written Opinion of International Patent Application No. PCT/US2023/084326; Dated May 1, 2024; 7 pages.

Zhang, J. et al., Rays Priors through reprojection: Improving Neural Radiance Fields for Novel View Extrapolation", 2022 IEEE/CVF Conference on Computer Vision and Pattern Recognition", 2022, 11 pages.

* cited by examiner

302

304

306

308

310

Computing
System
500

UNLOCKING LIGHTWEIGHT FAST 3D VISUALIZATION WITH NEURAL RADIANCE REPRESENTATIONS

CROSS REFERENCE TO RELATED APPLICATIONS

This application claims benefit under 35 U.S.C. § 119(e) to U.S. Provisional Patent Application Ser. No. 63/433,009 filed on Dec. 15, 2022 with the title "UNLOCKING LIGHT-WEIGHT FAST 3D VISUALIZATION WITH NEURAL RADIANCE REPRESENTATIONS". U.S. Provisional Patent Application Ser. No. 63/433,009 is hereby incorporated by reference in its entirety.

BACKGROUND

Graphics and 3D visualization techniques are becoming more important with the rise of new visual applications such as Augmented Reality, 3D modeling, and Digital Twins, as well as the increase of compute power and Graphical Processing Units (GPUs). With the developments in data-driven technologies, neural environment representations, such as Neural Radiance Fields (NeRF), emerge as a way to perform high quality 3D visualization with light-weight neural networks.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, a method of visualization, comprises capturing a plurality of two-dimensional images, generating transforms for each of the plurality of two-dimensional images, generating a three-dimensional representation of an object or scene based on the transforms, wherein the three-dimensional representation is a novel view, and rendering the three-dimensional representation of the object or scene.

In general, in one aspect, a system for visualization, comprises a device for capturing a plurality of two-dimensional images, and a surface unit comprising a computer system having a computer processor. The computer processor is configured to generate transforms for each of the plurality of two-dimensional images acquired by the device, generate a three-dimensional representation of an object or scene based on the transforms, wherein the three-dimensional representation is a novel view, and render the three-dimensional representation of the object or scene.

In general, in one aspect, a computer program product comprises computer readable program code for causing a computer system to perform operations comprising capturing a plurality of two-dimensional images, generating transforms for each of the plurality of two-dimensional images, generating a three-dimensional representation of an object or scene based on the transforms, wherein the three-dimensional representation is a novel view, and rendering the three-dimensional representation of the object or scene.

Other aspects of the disclosure will be apparent from the following description and the appended claims.

BRIEF DESCRIPTION OF DRAWINGS

Like elements in the various figures are denoted by like reference numerals for consistency.

DETAILED DESCRIPTION

Figure 1:
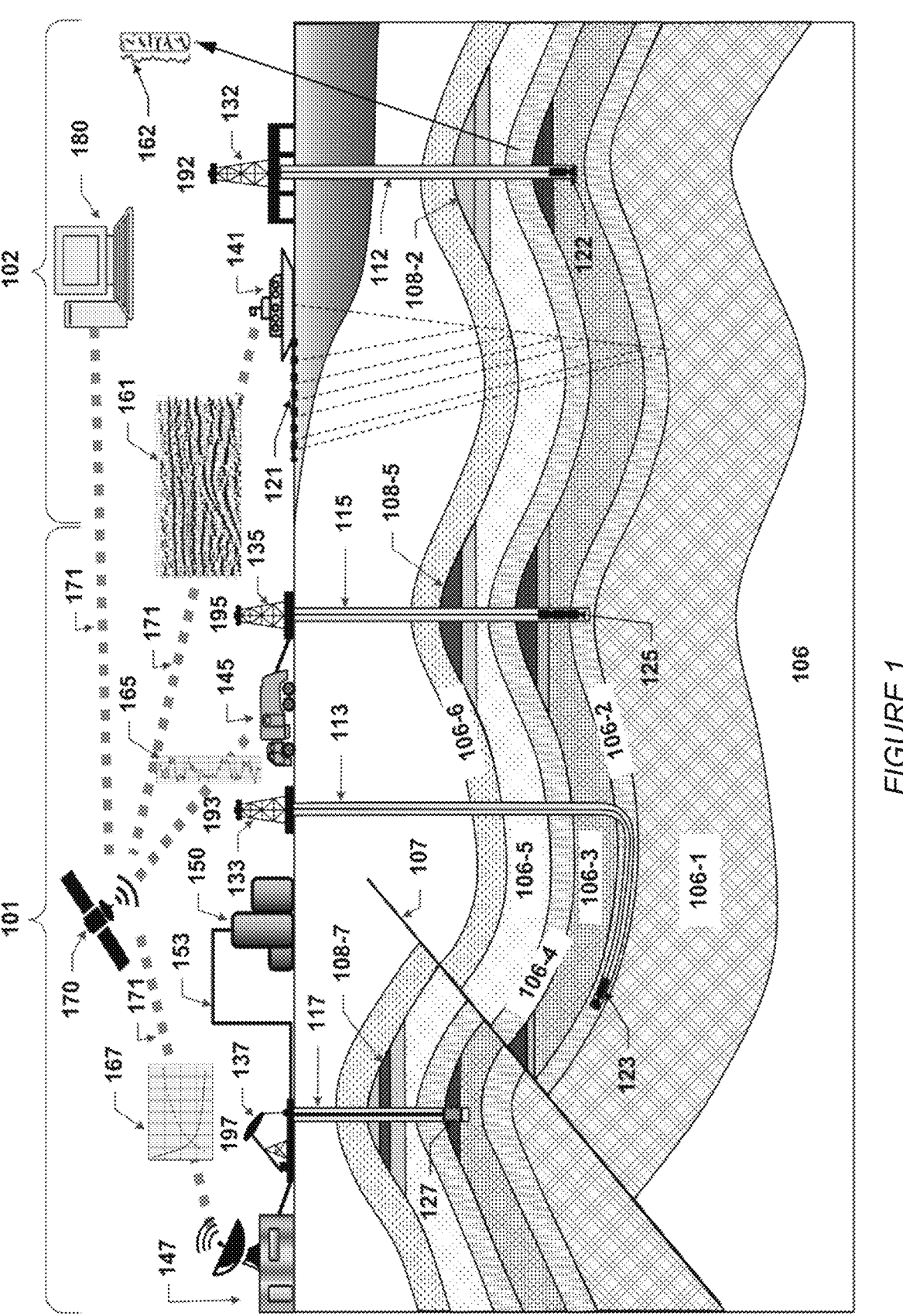
FIG. 1 shows an example of a well system in accordance with one or more embodiments.

Neural radiance fields (NeRF) provide a highly effective way to synthesize novel 3D views based on limited sets of 2D images representing a scene or object. Based on a small, lightweight model, such as a Multi Layer Perceptron (MLP), NeRF learns and captures 3D complex scenes with few neural parameters. Such techniques enable not only great portability (enhancing sustainability in transfer and computation cost) but unlocks valuable applications from 3D digital twins, robotics, and dynamic modeling to generating synthetic data. While the term NeRF is used throughout the description as the specific type of algorithm used in one or more embodiments, one skilled in the art should appreciate that the description is not limited to NeRF and that any algorithm that has the ability or is configured to synthesize novel 3D views based on limited sets of 2D images representing a scene/object may be used, regardless of the label. To provide context, a few of the applications for such technology are listed as embodiments in the following description.

1. Building visual digital twins requires high computation cost, realistic 3D visualization of assets and advanced computer graphics. By using NeRF, fast and lightweight 3D reconstruction requires only a few input images.

2. Recent research efforts use NeRF for robot navigation and manipulation. NeRF is also incorporated as part of robot dynamics simulation. This technology enables a fast reconstruction of facilities during inspection; specifically, robots go around the facility and capture images/video which are then passed to NeRF for generating a 3D representation of the facility.

3. Availability of data is a critical element for enabling learning for any data-driven method. Synthetically generated data is a growing field that allows narrowing down the gap and generating synthetic data to complement scenarios with limited or insufficient real datasets. NeRF provides a solution to generate synthetic novel views.

4. NeRFs also provide a way to enhance inventory management systems. Such technology is particularly useful for identifying existing anomalies in different manufacturing components with limited cost (only few images or videos). Moreover, smart monitoring of the flux is enabled for the tools to have a wider understanding of the usage.

In summary, visualizing items is a key element of human understanding and serves as a medium to provide interaction with the processes at a human level. Graphics and different graphical techniques are only becoming more important with the rise of new visual applications such as Virtual/Augmented Reality, 3D modeling, and Digital Twins, as well as the increasing desire for creative expression and visualization. Continued efforts are made to develop techniques (e.g., Photogrammetry, Videogrammetry, etc.) that enable visual representation of different processes that exist across all platforms and product lines of a company. Almost all of the techniques designed are very compute expensive as well as often being very time consuming.

With development in the data-driven technologies, the efforts of many are dedicated to development of data-driven visualization. One of such technologies that was recently introduced in European Conference on Computer Vision (ECCV) 2020 is NeRF. In one line "NeRF stores a volumetric scene representation as the weights of an MLP, trained on many images (2D representations of the scene)". The technique thus provides a way to synthesize novel views based on different viewing positions. NeRF does so by storing 3D geometry and texture and lighting data in a neural network. The impact of the NeRF paper lies in its brutal simplicity—just an MLP taking in a 5D coordinate and outputting density and color. The MLP is not a standard data-driven model; instead, it requires overfitting the scene and using the overfitted weights for rendering the novel views for the scene. Further, the technique provides a way to make the transfer of the models across different locations much cheaper as compared to transferring heavy 3D models. That being said, NeRF needs to be retrained each time for a new scene and is unable to be generalized to all scenes. The amount of training time required to achieve satisfactory results is expensive. Multiple efforts have been made to improve upon the performance of vanilla NeRF. One of such works is the "Instant-NGP" which allows training NeRF in minutes.

The one or more embodiments may be used with respect to databases and applications used during fluid (e.g., hydrocarbons, water, minerals, rare earth materials, other underground resources, etc.) exploration and extraction. Moreover, while not explicitly detailed in FIG. 1, one or more embodiments may be used with respect to aspects of the invention directed to midstream and production phase of operations.

As shown in FIG. 1, the fields (101), (102) include a geologic sedimentary basin (106), wellsite systems (192), (193), (195), (197), wellbores (112), (113), (115), (117), data acquisition tools (121), (123), (125), (127), surface units (141), (145), (147), well rigs (132), (133), (135), production equipment (137), surface storage tanks (150), production pipelines (153), and an E&P computer system (180) connected to the data acquisition tools (121), (123), (125), (127), through communication links (171) managed by a communication relay (170).

The geologic sedimentary basin (106) contains subterranean formations. As shown in FIG. 1, the subterranean formations may include several geological layers (106-1 through 106-6). As shown, the formation may include a basement layer (106-1), one or more shale layers (106-2, 106-4, 106-6), a limestone layer (106-3), a sandstone layer (106-5), and any other geological layer. A fault plane (107) may extend through the formations. In particular, the geologic sedimentary basin includes rock formations and may include at least one reservoir including fluids, for example, the sandstone layer (106-5). The rock formations may include at least one seal rock, for example, the shale layer (106-6), which may act as a top seal. The rock formations may include at least one source rock, for example, the shale layer (106-4), which may act as a hydrocarbon generation source. The geologic sedimentary basin (106) may further contain hydrocarbon or other fluids accumulations associated with certain features of the subsurface formations. For example, accumulations (108-2), (108-5), and (108-7) associated with structural high areas of the reservoir layer (106-5) and containing gas, oil, water or any combination of these fluids.

Data acquisition tools (121), (123), (125), and (127), may be positioned at various locations along the field (101) or field (102) for collecting data from the subterranean formations of the geologic sedimentary basin (106), referred to as survey or logging operations. In particular, various data acquisition tools are 'adapted to measure the formation and detect the physical properties of the rocks, subsurface formations, fluids contained within the rock matrix and the geological structures of the formation. For example, data plots (161), (162), (165), and (167) are depicted along the fields (101) and (102) to demonstrate the data generated by the data acquisition tools. Specifically, the static data plot (161) is a seismic two-way response time. Static data plot (162) is core sample data measured from a core sample of any of subterranean formations (106-1 to 106-6). Static data plot (165) is a logging trace, referred to as a well log. Production decline curve or graph (167) is a dynamic data plot of the fluid flow rate over time. Other data may also be collected, such as historical data, analyst user inputs, economic information, and/or other measurement data and other parameters of interest.

The acquisition of data shown in FIG. 1 may be performed at various stages of planning a well. For example, during early exploration stages, seismic data may be gathered from the surface to identify possible locations of hydrocarbons. The seismic data may be gathered using a seismic source that generates a controlled amount of seismic energy. In other words, the seismic source and corresponding sensors (121) are an example of a data acquisition tool. An example of seismic data acquisition tool is a seismic acquisition vessel (141) that generates and sends seismic waves below the surface of the earth. Sensors (121) and other equipment located at the field may include functionality to detect the resulting raw seismic signal and transmit raw seismic data to a surface unit, e.g., the seismic acquisition vessel (141). The resulting raw seismic data may include effects of seismic wave reflecting from the subterranean formations (106-1 to 106-6).

After gathering the seismic data and analyzing the seismic data, additional data acquisition tools may be employed to gather additional data. Data acquisition may be performed at various stages in the process. The data acquisition and corresponding analysis may be used to determine where and how to perform drilling, production, and completion operations to gather downhole hydrocarbons from the field. Generally, survey operations, wellbore operations and production operations are referred to as field operations of the field (101) or (102). These field operations may be performed as directed by the surface units (141), (145), (147). For example, the field operation equipment may be controlled by a field operation control signal that is sent from the surface unit.

Further as shown in FIG. 1, the fields (101) and (102) include one or more wellsite systems (192), (193), (195), and (197). A wellsite system is associated with a rig or a production equipment, a wellbore, and other wellsite equipment configured to perform wellbore operations, such as logging, drilling, fracturing, production, or other applicable operations. For example, the wellsite system (192) is associated with a rig (132), a wellbore (112), and drilling equipment to perform drilling operation (122). A wellsite system may be connected to a production equipment. For example, the well system (197) is connected to the surface storage tank (150) through the fluids transport pipeline (153).

The surface units (141), (145), and (147), may be operatively coupled to the data acquisition tools (121), (123), (125), (127), and/or the wellsite systems (192), (193), (195), and (197). In particular, the surface unit is configured to send commands to the data acquisition tools and/or the wellsite systems and to receive data therefrom. The surface units may be located at the wellsite system and/or remote locations. The surface units may be provided with computer facilities (e.g., an E&P computer system) for receiving, storing, processing, and/or analyzing data from the data acquisition tools, the wellsite systems, and/or other parts of the field (101) or (102). The surface unit may also be provided with, or have functionality for actuating, mechanisms of the wellsite system components. The surface unit may then send command signals to the wellsite system components in response to data received, stored, processed, and/or analyzed, for example, to control and/or optimize various field operations described above. The term "optimize," as used herein, refers to satisfying a mathematical optimization function.

The surface units (141), (145), and (147) may be communicatively coupled to the E&P computer system (180) via the communication links (171). The communication between the surface units and the E&P computer system (180) may be managed through a communication relay (170). For example, a satellite, tower antenna or any other type of communication relay may be used to gather data from multiple surface units and transfer the data to a remote E&P computer system (180) for further analysis. Generally, the E&P computer system (180) is configured to analyze, model, control, optimize, or perform management tasks of the aforementioned field operations based on the data provided from the surface unit. The E&P computer system (180) may be provided with functionality for manipulating and analyzing the data, such as analyzing seismic data to determine locations of hydrocarbons in the geologic sedimentary basin (106) or performing simulation, planning, and optimization of E&P operations of the wellsite system. The results generated by the E&P computer system (180) may be displayed for a user to view the results in a two-dimensional (2D) display, three-dimensional (3D) display, or other suitable displays. Although the surface units are shown as separate from the E&P computer system (180) in FIG. 1, in other examples, the surface unit and the E&P computer system (180) may also be combined. The E&P computer system (180) and/or surface unit may correspond to a computing system.

The acquisition of data shown in FIG. 1 may be performed at various stages of planning a well or performing other subsurface operations. For example, during early exploration stages, data may be gathered from the surface to identify possible locations of hydrocarbons, water, or other underground resources. The data may be gathered using a seismic source that generates a controlled amount of seismic energy. In other terms, the seismic source, and corresponding sensors are an example of a data acquisition tool. An example of a seismic data acquisition tool is a seismic acquisition vessel that generates and sends seismic waves below the surface of the earth. Sensors and other equipment located at the field may include functionality to detect the resulting raw seismic signal and transmit raw seismic data (or other data) to a surface unit. The resulting raw data may include the effects of one or more seismic waves reflecting from the subterranean formations.

In accordance with one or more embodiments, the disclosure describes generating low-cost visual digital twins. Most current solutions generating digital twins require either an expensive set-up (manually creating an environment based on CAD models of tools and equipment) or expensive hardware and tools (Lidar, lasers, etc.).

In accordance with one or more embodiments, the disclosure describes anomaly detection during the manufacturing process heavily relies on expensive laser scanners, proprietary software and heavy data processing. To make the workflow less costly and faster, a need exists for faster and cheaper technology. In addition, anomaly or change detection may also be used for wear and tear detection/quantification as it related to tools and equipment.

In accordance with one or more embodiments, the disclosure describes generating synthetic data from real life objects. Most synthetic data generators are based on CADs of equipment and tools and do not capture real lighting conditions, texture and wear. By using an input device (such as a camera based solution) and 3D scene generator (NeRF), large amounts of data may be generated based on a few images of the equipment while keeping information about the environment (lighting, texture and reflections).

In accordance with one or more embodiments, the disclosure describes NeRF that provides a highly effective way to synthesize novel 3D views based on limited sets of 2D images and capture 3D complex scenes with few neural parameters. This method enables not only great portability (enhancing sustainability in transfer and computation cost) but unlocks valuable applications from 3D digital twins, robotics and dynamic modeling to generate synthetic data.

Advantages of applying NeRF include a small model, end-to-end training, light-weight (transfer NeRF model/weights instead of heavy 3D objects), emissions monitoring (phase 2 and 3)—inferring from smaller and light-weight models requires less compute/power=>sustainability. Building visual digital twins requires high computation cost, realistic 3D visualization of assets and advanced computer graphics. By using NeRF, fast and lightweight 3D reconstruction requires only a few input images.

Availability of data is a critical element for enabling learning for any data-driven method. Synthetically generated data is a growing field that allows narrowing down the gap and generating synthetic data to complement scenarios with limited or insufficient real datasets. NeRF provides a solution to generate synthetic novel views. NeRF may be used to generate large synthetic datasets used to train machine learning models requiring realistic and large input datasets.

As one of the first steps in the development of Neural rendering, the technology provides a computationally cheap, fast, and simple solution that allows generation of novel 3D views based on limited sets of 2D images representing a scene. These aspects enable lighter payloads on robots, easily portable models enabling faster collaboration, ease of 3D reconstruction of digital twins. The technology enables environment reconstruction, which is useful as a simulation world for robotics and enable faster generation of synthetic datasets.

Photogrammetry and laser tracking may be alternative options but in the longer run, such techniques are seen as complementing each other based on the requirements of a particular use case. If a particular use case demands highest of the resolutions and the highest of the precision with no constraints on time and compute resources, laser tracking is a solution; however, if the same is required with some constraints on time and compute resources as well as the ease of portability, NeRF solutions are considered. Moreover, the possibility exists for merging these different techniques. In fact, all the different 3D reconstruction techniques may be combined in certain embodiments.

The technology has a great scope of applications in different domains involving graphics and 3D reconstruction. After being introduced the very first time, different variants have been introduced for optimizing the performance and unlocking more potential.

Robotics is a developing field, and many are contemplating how the robots may be used for monitoring remote facilities. NeRF is a great resource to enable and expand the usage of robots. For example, when enabling robots to be trained, a requirement is to have a synthetic mapping of the environment in which the robots operate. NeRF provides a way to generate this mapping as a digital twin for the facility. On the other hand, one of the ways where NeRF expands upon after deployment after the digital twins are generated is to enable change monitoring. In this particular scenario, robots travel around the facility and capture images/video which are then passed to NeRF for generating a 3D representation of the facility. Comparing the different generated digital twins at different time enables visualization of the change through the time. Such a technique also is useful for anomaly detection (e.g., rust identification on pipes), as well as serve as a way to have visibility into the remote location.

NeRFs may also provide a way to enhance inventory management systems. NeRFs may be particularly useful for identifying the anomalies existing in different components. Moreover, it could enable smart monitoring of the flux for the tools to have a wider understanding of the usage.

Availability of data is a critical element for enabling learning for any of the data-driven methods. Synthetically generated data allows to narrow down the gap by providing data for scenarios where collected data from real-life is insufficient in quantity. NeRF provides a novel way to generate synthetic data.

Figures 2A, 2B:
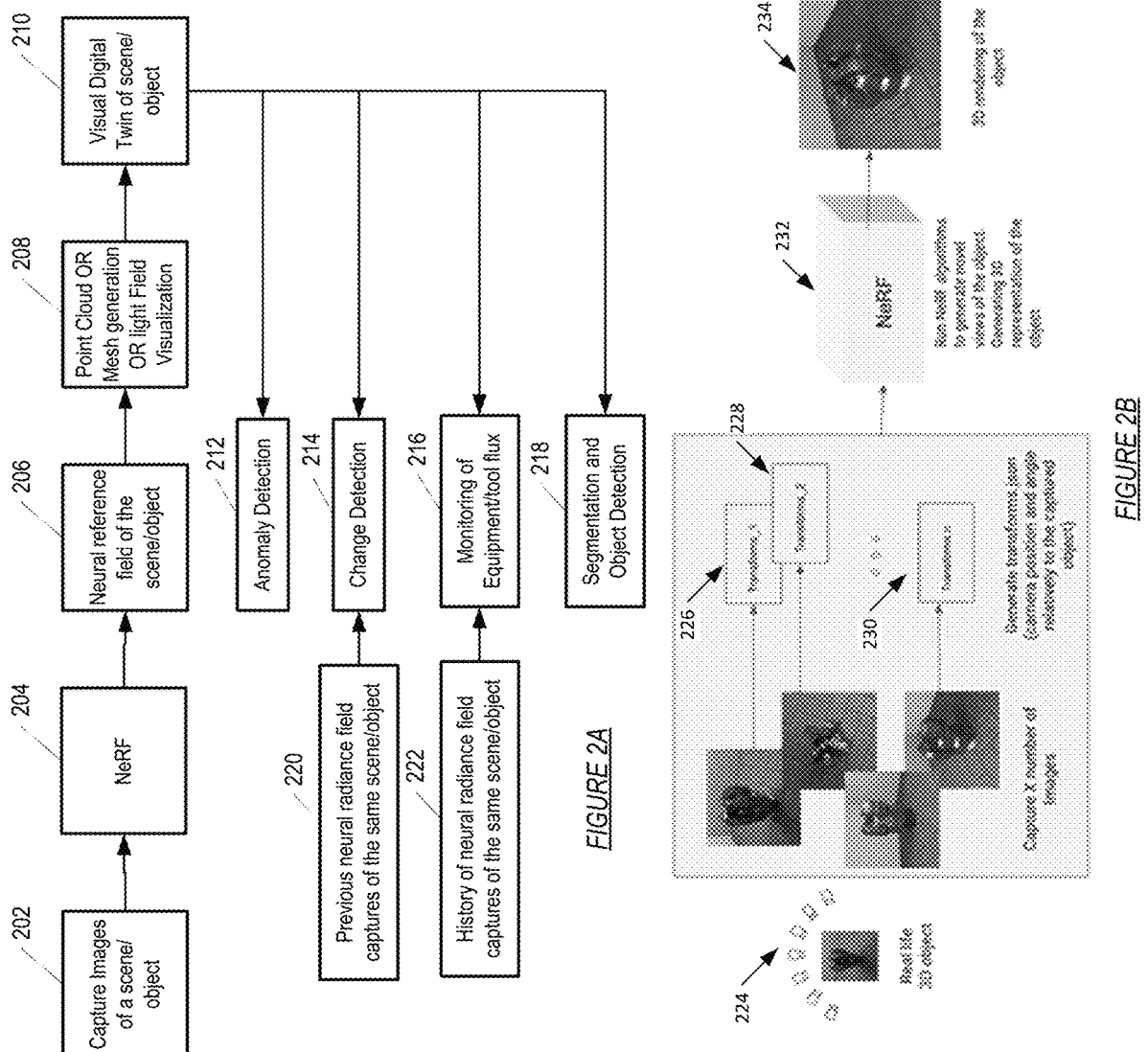
FIG. 2A and FIG. 2B show a flow diagram in accordance with one or more embodiments.

Turning to FIG. 2A, the methodology of applying NeRF and the capabilities afforded are shown as a data flow diagram, which is further described. Initially, at step 202, one or more images of a scene/object are captured. Essentially, the NeRF pipeline requires images of an object/scene. To capture the images, one or more of the following are the capture methods with different levels of information that may be useful. For the videos, stabilization could be added to reduce the motion blur; however, stabilization technology is an optional requirement.

1. Handheld Red Green Blue (RGB) camera to capture video (such as a phone, camera);
2. Handheld RGB camera to capture overlapping images (such as a phone, camera);
3. Depth camera to capture video (e.g., records depth information along with RGB data);
4. Depth camera to capture overlapping images (e.g., records depth information along with RGB data);
5. Drones or robots to capture outdoor scenes;
6. Thermal sensors to capture the thermal information;
7. LiDAR-based devices to record additional information used with RGB data;
8. Overlapping views from monitoring cameras (CCTV cams);
9. Any camera configurable to be attached to protective gear, such as cameras on a helmet (e.g., GoPro attached to the camera on a helmet);
10. Newer smart devices, such as glasses and Augmented Reality (AR)/Virtual Reality (VR) headsets; and/or
11. VR or any simulated environment.

Once the image(s) are captured, the process advances to step 204 where NeRF algorithm is run to generate novel view of the object. The result of this step is to generate a 3D representation of the scene/object. In step 206, the neural reference field of the 3D representation of the scene/object is identified. In step 208, a point cloud or mesh generation or light field visualization is generated based on the neural reference field of the scene/object. Finally, in step 210, a visual digital twin of the scene/object is obtained. Digital twins represent the shape of physical objects in 3D. Stated differently, the digital twins are a virtual representation of a real-world entity or system, which comes in the form of a software object or model that mirrors a unique physical object, process, organization, person or other abstraction.

As shown in FIG. 2A, once the visual digital twin(s) is obtained, several processes may be performed (either individually or in combination) on the visual digital twin(s). In particular, anomaly detection (212), change detection (214), monitoring of equipment/tool flux (216), and/or segmentation and object detection (218).

Anomaly detection (212) involves identifying something unusual or unexpected, such as a rusted pipe or an extra person at a well site, etc. If an anomaly is identified, then notification is provided, and further steps may be taken to address the anomaly. Anomaly detection during the manufacturing process heavily relies on expensive laser scanners, proprietary software and heavy data processing. As shown and described, applying NeRF makes the anomaly detection workflow less costly and faster.

Change detection (214) requires obtaining previous NeRF captures of the same scene/object (step 220). The previous NeRF captures are compared to each other to determine whether a change occurs. If so, the detection of the change is indicated and is made apparent.

Monitoring of equipment/tool flux (216) requires obtaining a history of NeRF captures of the same scene/object. The history of the NeRF captures allows for the monitoring of the use (e.g., number of times, duration, location, by whom, etc.) of the equipment/tool flux. Accordingly, the use of NeRF as outlined would enhance inventory management systems. Such technology is particularly useful for smart monitoring of the flux is enabled for the tools to have a wider understanding of the usage.

Segmentation and object detection (218) involves performing 3D segmentation algorithms along with the results. The output may be in multiple different formats, such as a 3D bounding box, 3D coordinates, the segmentation and object detection models output labels, all the points corresponding to that object, or a combination of all. Because of the information that may be extracted, the volume (relative) may be calculated, which is impossible in the 2D realm of images and videos. Also, the depth information that is available through the 3D segmentation masks in such a way that it may help the downstream tasks be more efficient by providing the downstream tasks with a relative understanding of the order of different objects. Going the NeRF route is considered to be beneficial because the same object is seen at different scales, thereby resulting in increasing the robustness of the developed segmentation technique and help integrate scale-agnostic processes into the application workflow. This technique becomes critical when doing segmentation at a significant scale because not all objects appear at the same scale.

Turning to FIG. 2B, a dataflow diagram is shown of a use case involving a drill bit. At 224, multiple images of a real life 3D object (a roller cone drill bit) are captured in a manner and using a device, such as a camera, described with regard to FIG. 2A. Next the multiple images captured are transformed into transform_1 (226), transform_2 (228), and transform_n (230). The transforms are generated as JSON files to not only capture the images but also information such as camera position and angle relative to the captured image of the object. A JSON file is a file that stores simple data structures and objects in JavaScript Object Notation (JSON) format, which is a standard data interchange format. JSON is primarily used for transmitting data between a web application and a server. JSON files are lightweight, text-based, human-readable, and can be edited using a text editor. While JSON is used in this example, the type of file saved may change as long as the functionality exists to store simple data structures and objects, may be used for transmitting data between a web application and a server, and is lightweight.

Continuing with FIG. 2B, the transforms are fed to NeRF algorithms (232). The NeRF algorithms are run to generate novel view of the scene/object by generating 3D representations of the scene/object. At 234, a 3D rendering of an object showing the 3D roller cone drill bit. FIG. 3C shows another example of a 3D rendering of a scene. FIG. 3C is an example of the output (in the form of a 3D rendering) that shows how the tagging pipeline might highlight the object of interest (could be a bounding box or the corresponding coordinates instead of the shaded region depending on the kind of segmentation method used). In this example, the object of interest (306) is a "swing" within the scene of a workspace. Further, 308 in FIG. 3D and 310 in FIG. 3E show examples of the output (in the form of a 3D rendering) for a scene. In particular, FIG. 3D and FIG. 3E show screenshots (308, 310) of the output (taken from the renderer that renders the whole room) for a coffee/break room.

Figure 3A:
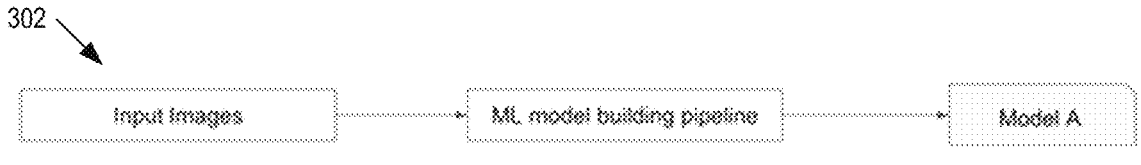
FIG. 3A and FIG. 3B show a flow diagram in accordance with one or more embodiments.
Figure 3B:
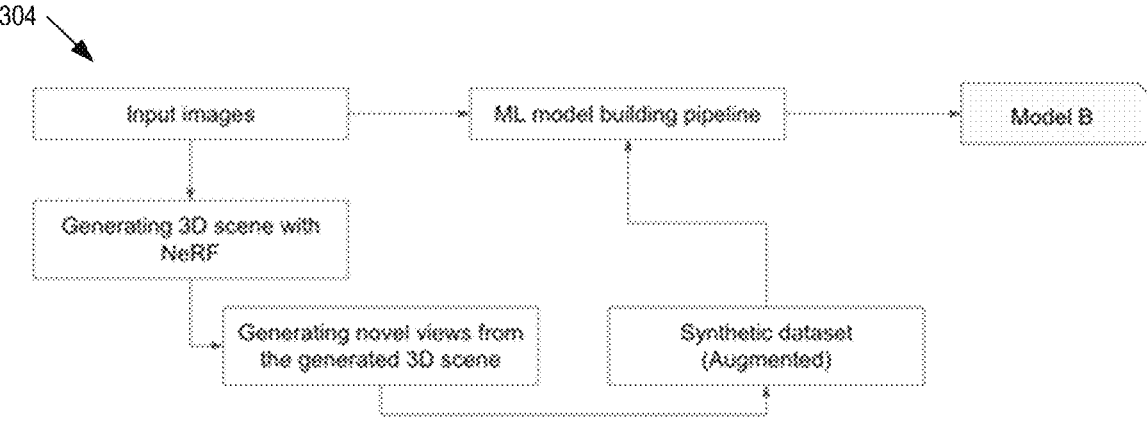
Figure 3C:
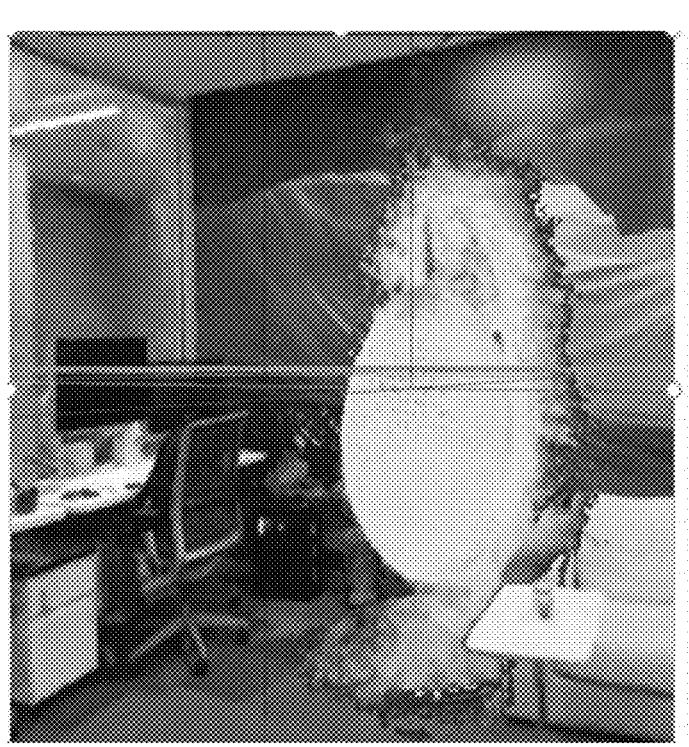
FIG. 3C, FIG. 3D, and FIG. 3E show an example of output in accordance with one or more embodiments.
Figure 3D:
Figure 3E:

FIG. 3A, FIG. 3B, FIG. 3C, FIG. 3D, and FIG. 3E show an example of use cases using the process and techniques described in relation to FIG. 2A and FIG. 2B. FIG. 3A shows a relatively simple use case where the process (302) involves inputting the images, which are input into the machine learning (ML) model building pipeline where the segmentation occurs to generate Model A. FIG. 3B shows a more complex use case where the process (304) involves inputting the images, which are input into the machine learning model building pipeline where the segmentation occurs to generate Model B. Moreover, the images are used to generate a 3D scene with NeRF (as described in relation to FIG. 2A and FIG. 2B). Next, novel views are generated from the 3D scene generated with NeRF followed by augmenting the novel views with a synthetic dataset. The novel views with the synthetic dataset is then fed into the ML model building pipeline.

As described in relation to the discussion of FIG. 2A and FIG. 2B, the output of NeRF process applied to the image and processing the generated 3D scene/object using the model building pipeline is rendered in the form of 3D images of scenes/objects (306, 308, 310) as shown in FIG. 3C, FIG. 3D, and FIG. 3E.

Figure 4:
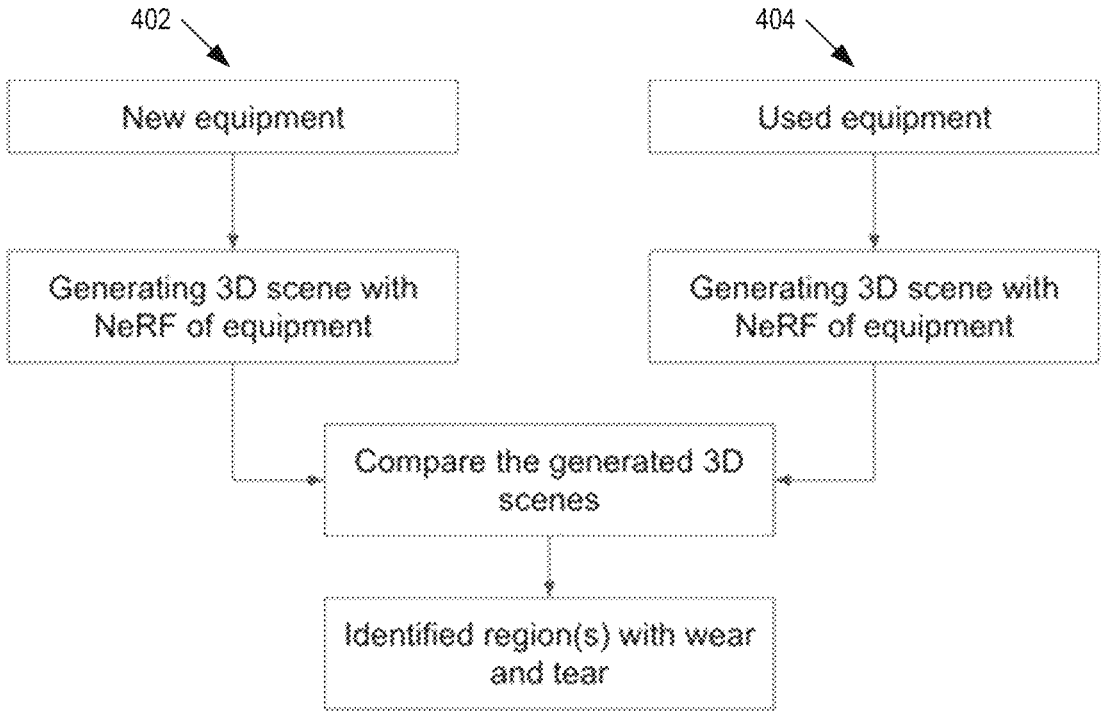
FIG. 4 shows a flow diagram in accordance with one or more embodiments.

As a further use case, FIG. 4 shows using the process outlined in FIG. 2A and FIG. 2B for an enhanced inventory management system. NeRFs provide a way to enhance inventory management systems that can use history for example smart monitoring of flux is enabled for the tools to have a wider understanding of the usage (change detection, anomaly detection, etc.). As shown in FIG. 4, a process (402) involving new equipment and a process (404) involving used equipment is shown. The enhanced inventory management system identifies and imports both new equipment and used equipment. Next, a 3D scene is generated with NeRF of both types of equipment. Next, the generated 3D scenes of the equipment are compared. Based on the comparison, one or more regions with wear and tear are identified.

Embodiments may be implemented on a computing system (either as a physical computing system, a cloud-based computer system, or a combination thereof) specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware (as physical or cloud-based components) may be improved by including the features and elements described in the disclosure.

Figure 5A:
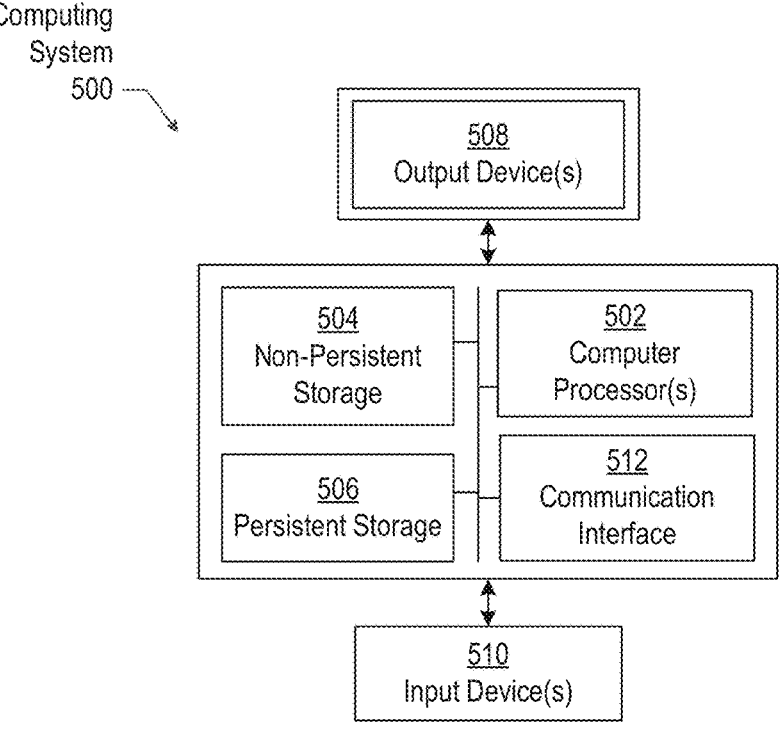
FIG. 5A and FIG. 5B show a computing system in accordance with one or more embodiments.

For example, as shown in FIG. 5A, the computing system (500) may include one or more computer processors (502), non-persistent storage (504), persistent storage (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) may be one or more cores or micro-cores of a processor. The computer processor(s) (502) includes one or more processors. The one or more processors may include a central processing unit (CPU), a graphics processing unit (GPU), a tensor processing unit (TPU), combinations thereof, etc.

The input devices (510) may include a touchscreen, keyboard, mouse, microphone, touchpad, electronic pen, or any other type of input device. The input devices (510) may receive inputs from a user that are responsive to data and messages presented by the output devices (512). The inputs may include text input, audio input, video input, etc., which may be processed and transmitted by the computing system (500) in accordance with the disclosure. The communication interface (508) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the output devices (512) may include a display device, a printer, external storage, or any other output device. One or more of the output devices may be the same or different from the input device(s). The input and output device(s) may be locally or remotely connected to the computer processor(s) (502). Many different types of computing systems exist, and the aforementioned input and output device(s) may take other forms. The output devices (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. The software instructions may be part of a computer program product. Further, the software instructions may correspond to computer readable program code that, when executed by a processor(s), is configured to perform one or more embodiments, which may include transmitting, receiving, presenting, and displaying data and messages described in the other figures of the disclosure.

Figure 5B:
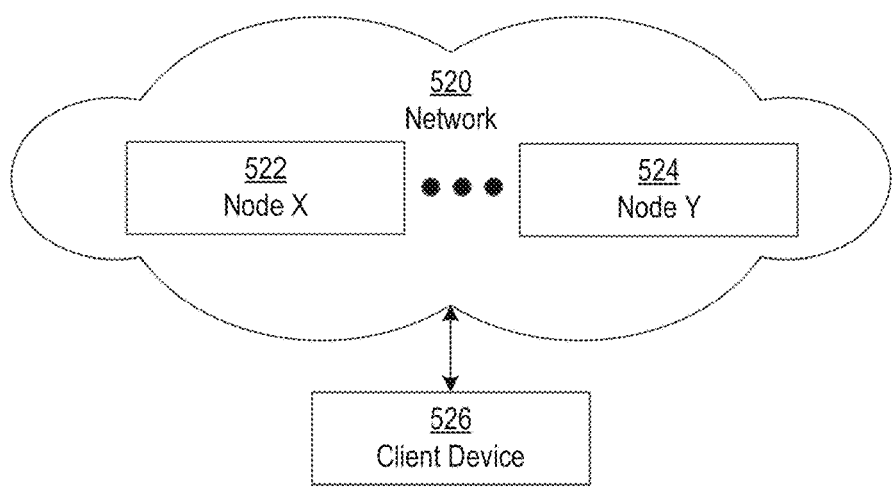

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522), node Y (524)) in the network (520) may be configured to provide services for a client device (526), including receiving requests and transmitting responses to the client device (526). For example, the nodes may be part of a cloud computing system. The client device (526) may be a computing system, such as the computing system shown in FIG. 5A. Further, the client device (526) may include and/or perform all or a portion of one or more embodiments.

The computing system of FIG. 5A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method of visualization, comprising:
receiving a plurality of two-dimensional images associated with wellsite production equipment, wherein each of the plurality of two-dimensional images comprises at least one object corresponding to the wellsite production equipment;
determining a camera position relative to the at least one object in each of the plurality of two-dimensional images;
determining a camera angle relative to the at least one object in each of the plurality of two-dimensional images;
generating a file for each of the plurality of two-dimensional images based on the camera position and the camera angle, wherein each file comprises structured information corresponding to the camera position and the camera angle in each of the plurality of two-dimensional images;
generating a three-dimensional representation of the at least one object based on providing the file for each of the plurality of two-dimensional images to a neural radiance field (NeRF) model, wherein the three-dimensional representation is a novel view of the at least one object with respect to each view of the at least one object in each of the plurality of two-dimensional images;
rendering the three-dimensional representation of the at least one object;
receiving a historical three-dimensional representation of the at least one object previously generated by the NeRF model, wherein the historical three-dimensional representation is generated based on one or more previous NeRF captures of the at least one object over a period of time; and
determining an indication of use of the at least one object based on a comparison between the three-dimensional representation of the at least one object and the historical three-dimensional representation of the at least one object, wherein the indication of use comprises a number of times the at least one object has been interacted with, a duration of the interaction with the at least one object, or both.

2. The method of claim 1, further comprising:
performing anomaly detection using the three-dimensional representation.

3. The method of claim 1, further comprising:

running a neural radiance field (NeRF) algorithm on the file for each of the plurality of two-dimensional images to generate the three-dimensional representation of the at least one object.

4. The method of claim 1, further comprising:

performing segmentation and object detection using the three-dimensional representation.

5. The method of claim 1, wherein the three-dimensional representation is a visual digital twin of the at least one object.

6. The method of claim 1, wherein the plurality of two-dimensional images is received from a handheld RGB camera.

7. The method of claim 1, wherein the plurality of two-dimensional images is received from one or more sensors.

8. The method of claim 1, comprising identifying a degraded portion of the at least one object associated with wear and tear based on the comparison between the three-dimensional representation of the at least one object and the historical three-dimensional representation of the at least one object.

9. A system for visualization, comprising:

a device for capturing a plurality of two-dimensional images of wellsite production equipment, wherein each of the plurality of two-dimensional images comprises at least one object corresponding to the wellsite production equipment; and a surface unit comprising a computer system having a computer processor configured to:

receive the plurality of two-dimensional images from the device;

determine a camera position relative to the at least one object in each of the plurality of two-dimensional images;

determine a camera angle relative to the at least one object in each of the plurality of two-dimensional images;

generate a file for each of the plurality of two-dimensional images acquired by the device based on the camera position and the camera angle, wherein each file comprises structured information corresponding to the camera position and the camera angle in each of the plurality of two-dimensional images;

generate a three-dimensional representation of the at least one object based on providing the file for each of the plurality of two-dimensional images to a neural radiance field (NeRF) model, wherein the three-dimensional representation is a novel view of the at least one object with respect to each view of the at least one object in each of the plurality of two-dimensional images;

render the three-dimensional representation of the at least one object;

receive a historical three-dimensional representation of the at least one object previously generated by the NeRF model, wherein the historical three-dimensional representation is generated based on one or more previous NeRF captures of the at least one object over a period of time; and determine an indication of use of the at least one object based on a comparison between the three-dimensional representation of the at least one object and the historical three-dimensional representation of the at least one object, wherein the indication of use comprises a number of times the at least one object has been interacted with, a duration of the interaction with the at least one object, or both.

10. The system of claim 9, wherein the computer processor is configured to:

perform anomaly detection using the three-dimensional representation.

11. The system of claim 9, wherein the computer processor is configured to:

run a neural radiance field (NeRF) algorithm on the file for each of the plurality of two-dimensional images to generate the three-dimensional representation of the at least one object.

12. The system of claim 9, wherein the computer processor is configured to:

perform segmentation and object detection using the three-dimensional representation.

13. The system of claim 9, wherein the three-dimensional representation is a visual digital twin of the at least one object.

14. The system of claim 9, wherein the plurality of two-dimensional images is received from a handheld RGB camera.

15. The system of claim 9, wherein the plurality of two-dimensional images is received from one or more sensors.

16. The system of claim 9, wherein the computer processor is configured to:

identifying a degraded portion of the at least one object associated with wear and tear based on the comparison between the three-dimensional representation of the at least one object and the historical three-dimensional representation of the at least one object.

17. A non-transitory, computer-readable medium, comprising computer readable program code that, when executed by one or more processors of a computer system, causes the computer system to perform operations comprising:

receiving a plurality of two-dimensional images associated with wellsite production equipment, wherein each of the plurality of two-dimensional images comprises at least one object corresponding to the wellsite production equipment;

determining a camera position relative to the at least one object in each of the plurality of two-dimensional images;

determining a camera angle relative to the at least one object in each of the plurality of two-dimensional images;

generating a file for each of the plurality of two-dimensional images based on the camera position and the camera angle, wherein each file comprises structured information corresponding to the camera position and the camera angle in each of the plurality of two-dimensional images;

generating a three-dimensional representation of the at least one object based on providing the file for each of the plurality of two-dimensional images to a neural radiance field (NeRF) model, wherein the three-dimensional representation is a novel view of the at least one object with respect to each view of the at least one object in each of the plurality of two-dimensional images;

rendering the three-dimensional representation of the at least one object;

receiving a historical three-dimensional representation of the at least one object previously generated by the NeRF model, wherein the historical three-dimensional representation is generated based on one or more previous NeRF captures of the at least one object over a period of time; and determining an indication of use of the at least one object based on a comparison between the three-dimensional representation of the at least one object and the historical three-dimensional representation of the at least one object, wherein the indication of use comprises a number of times the at least one object has been interacted with, a duration of the interaction with the at least one object, or both.

18. The non-transitory, computer-readable medium of claim 17, wherein the computer readable program code, when executed by the one or more processors of the computer system, further causes the computer system to perform operations comprising:

running a neural radiance field (NeRF) algorithm on the file for each of the plurality of two-dimensional images to generate the three-dimensional representation of the at least one object.

19. The non-transitory, computer-readable medium of claim 17, wherein the computer readable program code, when executed by the one or more processors of the computer system, further causes the computer system to perform operations comprising:

identifying a degraded portion of the at least one object associated with wear and tear based on the comparison between the three-dimensional representation of the at least one object and the historical three-dimensional representation of the at least one object.

20. The non-transitory, computer-readable medium of claim 19, wherein the historical three-dimensional representation of the at least one object comprises a representation of the at least one object in a new condition.

* * * * *